United States Patent
Tomalin

[11] Patent Number: 5,945,010
[45] Date of Patent: Aug. 31, 1999

[54] ELECTRODE WIRE FOR USE IN ELECTRIC DISCHARGE MACHINING AND PROCESS FOR PREPARING SAME

[75] Inventor: Dandridge Sale Tomalin, Chagrin Falls, Ohio

[73] Assignee: Composite Concepts Company, Inc., Milford, N.H.

[21] Appl. No.: 08/922,187

[22] Filed: Sep. 2, 1997

[51] Int. Cl.⁶ .............................. B23H 1/06; B23H 7/08
[52] U.S. Cl. ......................................................... 219/69.12
[58] Field of Search ........................... 219/69.12, 69.15; 148/518, 536

[56] References Cited

U.S. PATENT DOCUMENTS

| | | |
|---|---|---|
| 2,378,458 | 6/1945 | Avallone . |
| 2,392,456 | 1/1946 | Brown et al. . |
| 2,918,722 | 12/1959 | Kenmore . |
| 4,193,852 | 3/1980 | Inoue .................................... 219/69.12 |
| 4,287,404 | 9/1981 | Convers et al. ...................... 219/69.12 |
| 4,304,113 | 12/1981 | Takei et al. . |
| 4,341,939 | 7/1982 | Briffod et al. ........................ 219/69.12 |
| 4,424,432 | 1/1984 | Kaneko et al. ....................... 219/69.12 |
| 4,640,747 | 2/1987 | Ueno et al. . |
| 4,686,153 | 8/1987 | Tominaga et al. .................... 219/69.12 |
| 4,839,487 | 6/1989 | Ito et al. ............................... 219/69.12 |
| 4,924,050 | 5/1990 | Hermanni ................................. 148/536 |
| 4,935,594 | 6/1990 | Groos et al. .......................... 219/69.12 |
| 4,977,303 | 12/1990 | Brifford ................................ 219/69.12 |
| 4,988,552 | 1/1991 | Tomalin ................................ 219/69.12 |
| 5,196,665 | 3/1993 | Brifford ................................ 219/69.12 |
| 5,762,726 | 6/1998 | Barthel et al. ........................... 148/518 |
| 5,808,262 | 9/1998 | Mukherjee ............................ 219/69.12 |

FOREIGN PATENT DOCUMENTS

| | | |
|---|---|---|
| 376248 | 7/1990 | European Pat. Off. ............... 148/536 |
| 733431 | 9/1996 | European Pat. Off. . |
| 0 526 361 B1 | 11/1995 | France . |
| 56-62730 | 5/1981 | Japan . |
| 56-126528 | 10/1981 | Japan . |
| 57-156129 | 9/1982 | Japan . |
| 58-59736 | 4/1983 | Japan . |
| 58-160019 | 9/1983 | Japan .................................. 219/69.12 |
| 59-129626 | 7/1984 | Japan . |
| 60-249528 | 12/1985 | Japan . |
| 61-136733 | 6/1986 | Japan . |
| 62-130128 | 6/1987 | Japan . |
| 62-218026 | 9/1987 | Japan . |
| 62-246425 | 10/1987 | Japan . |
| 1-210222 | 8/1989 | Japan . |
| 645831 | 10/1984 | Switzerland . |
| 646083 | 11/1984 | Switzerland ........................ 219/69.12 |
| 476125 | 10/1975 | U.S.S.R. . |
| 2069396 | 8/1981 | United Kingdom . |

OTHER PUBLICATIONS

*Constitution of Binary Alloys*, by Hansen et al., pp. 1059–1062, 1958.

*Primary Examiner*—Geoffrey S. Evans
*Attorney, Agent, or Firm*—Baker & Daniels

[57] ABSTRACT

A coated EDM wire electrode and a process for manufacturing a coated EDM wire electrode. The core of the electrode is composed of a first metal, for instance copper, or an alloy of a first metal, for instance brass, or a composite of a first metal, for instance copper clad steel. The core is coated with a second metal which has a heat of vaporization of less than 35 KJ/cm³, such as, for instance zinc. The coated core is then heated to form an alloy of the second metal and the first metal, for instance γ phase brass. The alloy has a content by weight of the second metal greater than 50% and has a melting point equal to or greater than 550° C.

22 Claims, 5 Drawing Sheets

FIG_1

FIG_2

FIG_7

FIG_8

FIG_5    FIG_6

FIG_9

ELECTRODE WIRE FOR USE IN ELECTRIC DISCHARGE MACHINING AND PROCESS FOR PREPARING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

This invention relates to electric discharge machining (EDM) and specifically to an electrode wire to be used in discharge machining and to the process for manufacturing an EDM electrode wire.

2. Description of the Relevant Prior Art

The process of electrical discharge machining (EDM) is well known. An electrical potential (voltage) is established between a continuously moving EDM wire electrode and an electrically conductive workpiece. The potential is raised to a level at which a discharge is created between the EDM wire and the workpiece. The intense heat generated by the discharge will melt and/or vaporize a portion of both the workpiece and the wire to thereby remove, in a very small increment, a piece of the workpiece. By generating a large number of such discharges a large number of increments are removed from the workpiece whereby the workpiece can be cut very exactly to have a desired planar contour. A dielectric fluid is used to establish the necessary electrical conditions to initiate the discharge and to flush debris from the active machining area.

The residue resulting from the melting and/or vaporization of a small increment (volume) of the surface of both the workpiece and EDM wire electrode is contained in a gaseous envelope (plasma). The plasma eventually collapses under the pressure of the dielectric fluid. The liquid and vapor phases created by the melting and/or vaporization of material are quenched by the dielectric fluid to form solid particulate matter or debris. The cutting process therefore involves repeatedly forming a plasma and quenching that plasma. This process may happen at the same time at many spots along the length of the EDM wire.

It is important for flushing to be efficient because, if flushing is inefficient, conductive particles build up in the gap which can create the potential for electrical shorts which can result in arcs. Arcs are very undesirable as they cause the transfer of a large amount of energy which causes large gouges or craters, i.e., metallurgical flaws, to be made in a workpiece or the EDM wire. Such flaws in the wire could cause the EDM wire to break catastrophically.

A composite surface layer on an EDM wire electrode being subjected to erosion is preferably sufficiently thick and tenacious enough to survive the erosion process. It preferably will have a low volumetric heat of sublimation which will allow it to sublime (vaporize) in preference to melting. Sublimation (the phase change of a solid as it transforms directly to a gas or vapor) will produce relatively small particulate debris when the vapor is condensed after being quenched by the dielectric fluid as the plasma envelope is collapsed at the conclusion of each discharge. Larger particulate debris will be produced by melting and will be more difficult to flush away by the hydraulic action of the dielectric fluid. Metals used for the surface layer of any EDM wire would preferably be characterized as having a low energy of sublimation, sometimes referred to as a low volumetric heat of sublimation measured in kilo joules per cubic centimeter ($KJ/cm^3$). Such metals are well-known in the prior art and include cadmium, bismuth, lead, zinc, tin, antimony or an alloy of those metals. Zinc has a relatively low volumetric heat of sublimation, and alloys of zinc will also have a relatively low heat of sublimation with alloys having the highest zinc content having the lowest volumetric heat of sublimation.

In addition to the physical properties of the exposed surface affecting flushability, the topography of the surface may also affect flushability. For example, a convoluted topography can promote hydraulic turbulence at the surface, thereby improving the flushing action of the dielectric fluid.

An EDM wire must possess a tensile strength that exceeds a desired threshold value to avoid tensile failure of the EDM wire electrode induced by the preload tension that is applied, and should also possess a high fracture toughness to avoid catastrophic failure induced by the flaws caused by the discharge process. Fracture toughness is a measure of the resistance of a material to flaws which may be introduced into a material and which can potentially grow to the critical size which could cause catastrophic failure of the material. The desired threshold tensile strength for EDM wire electrodes is generally thought to be in the range of 60,000 to 90,000 PSI.

Since the EDM wire must also conduct electricity, it is important that the EDM wire is a good conductor of electricity. The main function of the EDM wire electrode is to deliver electrical energy to the gap. Higher conductivity wire performs this function more efficiently. All other factors being equal, the highest conductivity EDM wire will always cut the fastest and therefore will be the most efficient.

The ideal traveling EDM wire electrode will therefore have: an adequately thick and tenacious surface layer with a low heat of sublimation; a tensile strength greater than the threshold value to prevent tensile failures; high fracture toughness; and good electrical conductivity.

It is known in the prior art to use an EDM wire electrode with a core composed of a material having relatively high mechanical strength with a relatively thin metallic coating covering the core and comprising at least 50% of a metal having a low volumetric heat of sublimation such as zinc, cadmium, tin, lead, antimony, bismuth or an alloy thereof. Such a structure is disclosed is U.S. Pat. No. 4,287,404 which discloses a wire having a steel core with a coating of copper or silver which is then plated with a coating of zinc or other suitable metal having a low volumetric heat sublimation.

It is also known from the prior art, for instance from U.S. Pat. No. 4,686,153, to coat a copper clad steel wire with zinc and thereafter to heat the zinc coated wire to cause dispersion diffusion of the copper into the zinc layer to thereby convert the zinc layer into a copper-zinc alloy. That patent describes the desirability of a β phase alloy layer for EDM purposes. The copper zinc alloy has a concentration of zinc of about 45% by weight with the concentration of zinc decreasing radially inwardly from the outer surface. The average concentration of zinc in the copper-zinc alloy layer is less than 50% by weight but not less than 10% by weight.

The surface layer therefore includes β phase copper-zinc alloy material at the outer surface since β phase copper-zinc alloy material has a concentration of zinc of 40%–50% by weight. While this patent recognizes that a copper-zinc alloy layer formed by means of a dispersion diffusion heat treatment may contain ε phase material (zinc content about 80%); γ phase material (zinc content about 65%); β phase material (zinc content about 45%); and a phase material (zinc about 35%) in accordance with Hansen's phase diagram, this patent indicates that the preferred alloy material is β phase alloy material.

Due to the nature of the EDM process, EDM machining is a relatively slow process. In many wire EDM applications, the surface finish of the part being fabricated is of critical importance. In order to achieve superior surface finish on the completed part, many operators will "rough cut" the part to slightly oversized dimensions and subsequently perform multiple (sometimes as many as five to eight) "skim cuts" where they employ reduced power to thereby attempt to remove only a small amount of the surface, i.e. minute bites per discharge. This procedure allows the operator to maintain very tight dimensional control on the part geometry while simultaneously creating a much smoother surface finish. Obviously the number of "skim" passes required to achieve a given surface finish can have a large impact on the cost of a given part, and EDM operators are always seeking ways to achieve improved surface finish at competitive metal removal rates. It is therefore desired to improve the speed of cutting without degrading the surface finish achieved by the cutting process.

Also, many of the more recent EDM wire installations include an "autothreading" system. All wire EDM machines include an upper and lower wire guide system that accurately positions the wire by passing it through a high tolerance wire guide that may be only several microns larger than the actual wire diameter. If the wire breaks during the machining process, or if an internal cavity has been cut and one needs to move to another area to cut additional internal cavities, it is necessary to rethread the wire through these guides to continue the machining operation. These "autothread" systems all operate much more reliably if the wire being threaded through them is very straight. Therefore, it is also desired to provide EDM wire with improved mechanical properties, such as stiffness and straightness, to facilitate reliable "autothreading."

SUMMARY OF THE INVENTION

The present invention provides an EDM wire including an outer coating of a metal or metal alloy material and a process for making the wire.

The invention comprises, in one form thereof, an EDM wire with a core which is comprised of a first metal or a metal alloy, such as for instance copper, brass, or copper clad steel, and a coating formed of a metal or metal alloy with a relatively low volumetric heat of sublimation and a relatively high melting point such as, for instance, a copper-zinc γ phase alloy. The coating may cover substantially all or only a portion of the surface of the core.

The invention also comprises a process for manufacturing EDM wire. The process comprises coating a metallic core with a metal coating such as, for instance, a zinc coating. The coated core is then heat treated by diffusion annealing whereby the metal coating and the core metal form a γ phase alloy such as, for instance, a γ phase brass alloy. Substantially all of the coating will be transformed into γ phase alloy so that the coating contains an essentially constant composition from the outer surface of the wire to the core. The coated wire may then be drawn to finish size whereby the γ phase coating will be redistributed over the outer surface of the core in such a way that the coating does not completely cover the core but instead has gaps therein.

Alternatively, the wire may be drawn to finish size before the heat treatment but after the core is coated. In this process, after heat treating, the coating will completely cover the core and will not exhibit the gaps mentioned hereinabove.

The invention, in one form thereof, comprises an electrode wire for use in an EDM apparatus. The wire comprises a core composed of a first metal or an alloy of a first metal. A coating is disposed on the core. The coating is composed of a second metal or an alloy of a second metal, wherein the alloy is comprised of greater than 50% by weight of the second metal. The second metal has a volumetric heat of sublimation less than 35 KJ/cm$^3$. The coating has a melting point equal to or greater than 550° C.

The invention, in one form thereof, comprises an electrode wire for use in an EDM apparatus wherein the wire comprises a core which includes a first metal and a coating disposed on the core. The coating comprises a y phase alloy of a second metal which has a low volumetric heat of sublimation. The coating may either be discontinuous or continuous so that it may cover either the entire core surface area or only a portion of the core surface area. In one embodiment the coating is comprised of a copper-zinc alloy. In another embodiment the coating is comprised of a nickel-zinc alloy. The core may be comprised of copper clad steel, brass, or other suitable material. The coating second metal may consist of a metal selected from the group consisting of zinc, magnesium and aluminum.

The present invention, in another form thereof, comprises a wire for use in an EDM apparatus wherein the core is comprised of a first metal and a coating is disposed on the core. The coating comprises a copper-zinc alloy having a zinc content greater than 50% by weight and a melting point equal to or greater than 550° C.

In yet another embodiment of the invention, the invention comprises a process for manufacturing an EDM electrical wire wherein the process includes providing a metal core composed of a first metal. The core is then coated with a second metal which has a low volumetric heat of sublimation. The core is heat treated to cause the first and second metal to form an alloy having a melting point equal to or greater than 550° C. The wire is then drawn to finish size. Alternatively the wire may be drawn to finish size before heat treatment.

An advantage of the present invention is that the resulting EDM wire cuts faster than conventional EDM wire electrodes, or is capable of producing a superior finish at competitive metal removal rates.

A further advantage of the invention is that the higher zinc content in the coating compared to prior art EDM wire will result in a significantly lower volumetric heat of sublimation for the coating and therefore cause the wire to flush more efficiently while having enough tenacity to survive the EDM erosion process. In addition, the process for converting the coating to a binary alloy does not generate a concentration gradient, thereby maximizing the effectiveness of the enhanced zinc content.

Another advantage of the EDM wire according to the present invention is that the surface finish of material cut with the EDM wire according to the present invention can be made to exhibit less surface roughness than material cut with conventional EDM wires.

The invention also creates a convoluted surface topography by converting the surface layer by heat treatment to a brittle alloy such as γ phase brass, and then by cold drawing the wire to a finish diameter. The brittle alloy, such as γ phase brass, fractures and embeds itself in the surface or the core, thereby producing a convoluted topography. Such a configuration can create hydraulic turbulence at the EDM wire surface thereby enhancing the flushing action of the dielectric.

The invention makes a significant advance in the ability of EDM wire to generate improved surface finishes at competitive metal removal rates. The enhanced flushing one can achieve with a coating having a high melting point and a low volumetric heat of sublimation allows one to cut at high metal removal rates, thereby making the EDM process more efficient. However, the benefit of efficient cutting rates can also be taken as an improved surface finish by reducing the power until one is cutting at the same metal removal rate one considers competitive with any other available EDM wire electrode. Under these conditions, i.e., the same metal removal rate, the current invention will require significantly lower power and each individual discharge will remove a lesser amount of workpiece than with conventional wire formulations. By producing smaller "craters" with each discharge, the surface finish is significantly improved.

Yet still another advantage of the invention is that as the wire is eroded, the lack of a gradient will not cause the performance of the wire to degrade as the zinc content is relatively constant throughout the coating.

A still further advantage of the invention is that it will provide an EDM wire electrode with: an adequately thick and tenacious surface layer with a low heat of sublimation and a relatively high melting point; a tensile strength greater than the threshold value to prevent tensile value; high fracture toughness; and good electrical conductivity.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

It is known that an EDM wire will cut more efficiently with a higher zinc content. For instance an EDM wire with a zinc coating or an EDM wire with a brass alloy coating having a high zinc content will cut more efficiently than a wire with a surface having a lower zinc content. γ phase brass has a high zinc content, approximately 65% zinc on average, and also has a relatively high melting point, approximately 800° C., and therefore should be an excellent EDM wire coating. By way of comparison β phase brass has a zinc content of 45% zinc on average with a melting point of approximately 880° C.

Unfortunately, it is nearly impossible to cold draw γ phase alloy material because it is very brittle. However, I have discovered γ phase alloy material is broken up and redistributed during cold drawing. By keeping the thickness of a γ phase coating, prior to drawing, relatively thin, enough surface coverage with γ phase material can be obtained during cold drawing so that the γ phase alloy material still acts as an effective flushing enhancer. The thickness of the γ phase alloy coating, after heat treatment, should be such that it is not too thick as this would cause the material to be too brittle, nor too thin as this would cause insufficient surface coverage for proper performance. If the γ phase alloy coating is thick, drawing may be accomplished better at a higher temperature above its recrystallization temperature, but this technique requires specialized wire drawing equipment.

Figure 1:
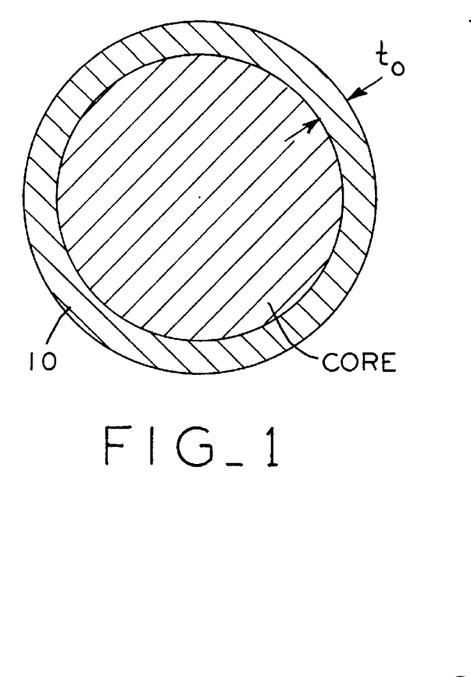
FIG. 1 is a schematic drawing of a cross section of an EDM wire with a continuous surface coating.
Figure 2:
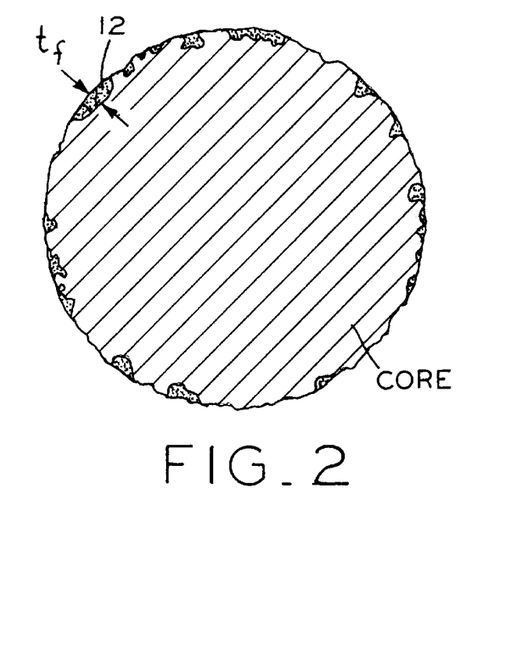
FIG. 2 is a schematic drawing of an EDM wire with a discontinuous surface coating.

As the γ phase alloy coating is broken up during cold drawing, it may form a discontinuous or broken-up coating on the wire core that does not completely cover the surface of the wire core. FIG. 1 shows a schematic cross section of an EDM wire, after heat treatment with a continuous coating of γ phase alloy material. The thickness of the γ phase alloy coating 10 is shown as $t_o$. After the wire is drawn, it will look, in cross section, as shown in FIG. 2. Note that the γ phase alloy coating material 12 is broken up and does not completely cover the core. (FIGS. 1 and 2 are not shown to scale). Note also that the maximum thickness of the γ phase alloy material is $t_f$ which is smaller than $t_o$. The γ phase alloy material has been broken up and redistributed over the surface of the core. I have discovered that during the cold drawing of a thin γ phase material coating, the γ phase coating will be fractured internally and these particles will be redistributed over the core surface of the finish wire. Theoretically, the larger the size of the wire prior to drawing, the smaller the percentage of core surface of the finish size wire which is covered with γ phase alloy material, after drawing is complete. This is so because, as wire is drawn from a starting size to a smaller finish size, the total surface area of the finish size wire will be greater than the total surface area of the starting wire. Since γ phase alloy material is quite brittle and will not plastically deform, the volume of surface coating (γ phase material) which is available on the wire before drawing remains constant during drawing. If only a limited amount of new surface area is created by internal fracturing of the γ phase alloy coating due to its brittleness, then the actual surface coverage of the γ phase alloy material coating on the finish wire will be greater due to redistribution of the fractured γ phase material, but less than 100%, than that if no new surface area were created. Thus, while the theoretical ratio of the surface area of a starting wire to the surface area of a finish wire can be calculated, the actual ratio of surface coverage by the γ phase material of the finish wire will not be equal to this theoretical ratio. The reason for this discrepancy is that the γ coating material is fractured and is redistributed over the EDM wire core. By way of example, if we calculate the ratio of the surface areas of starting wire to finish wire, we can write $$\text{surface area ratio}\% = \frac{\text{surface area starting wire}}{\text{surface area finish wire}} \times 100$$

For a starting wire having a diameter of 0.64 mm and a finish wire having a diameter of 0.25 mm, the theoretical surface area ratio is 39%. I have found that the actual surface area ratio for a reduction in size from a diameter of 0.64 mm to a diameter of 0.25 mm is approximately 58%. Since the volume of γ phase coating material is constant it is apparent that the coating material is redistributed so that the thickness of the coating is smaller than the original thickness of the γ phase coating after heat treatment.

I have found that, while ideally the EDM wire core has 100% surface coating coverage, this is not actually needed for an effective EDM wire. I have found that I was able to obtain good EDM wire cutting results with less than 100% core surface coverage. For instance, EDM wire with surface coverage greater than 50% has been found to work well.

Since one is limited to a relatively thin coating of γ phase material because of the brittleness of the γ phase coating material, a higher zinc content core material is desirable to provide adequate flushing, in case the coating is completely consumed by erosion or to provide adequate flushing where the coating may never have existed because of its discontinuous character. The higher zinc content of the core material of such a coated product and the resultant higher tensile strength of the wire, combined with a very thin y phase material coating allows the wire to be drawn much straighter and more consistently straighter than conventional coated products. This is important because it facilitates the use of the wire on EDM machines equipped with "auto-thread" systems. Another advantage of a thin zinc coating thickness is that the electroplating step will be less expensive than if the relatively thick zinc coatings which were used with conventional diffusion annealed EDM wire products. Since the heat treating cycle required to produce the thin γ phase layer is relatively short and heat treating is accomplished at a much lower temperature than in conventional products, the production cost of EDM wire with a thin γ phase alloy coating according to the present invention is much lower than for conventional EDM wire products. Thus, the economics of EDM wire manufactured according to the present invention is much more favorable than the economics of manufacturing conventional diffusion annealed EDM wire with thicker coatings.

I have found that the EDM wire according to the present invention outperforms common brass EDM wire, zinc coated brass EDM wire, and β phase coated EDM brass wire. Further, one of the common complaints about conventional zinc coated brass and β phase coated EDM brass wires is their abrasion of wire guides and the tendency of the coatings to be contaminated with zinc oxide. A γ phase brass coating should be less abrasive than zinc and should have less tendency to be contaminated with zinc oxide than both zinc and β phase material since it can be processed at lower temperatures than both these prior art types of EDM wire products.

In the following examples, EDM wire was produced with a finish diameter of 0.25 mm and a starting size at heat treatment as shown. Three of the specimens had an identical core of alpha phase brass (35% zinc, 65% copper). One of the specimens had a core of copper clad steel. Table 1 shows the specimens hereinafter described in Examples 1–5.

TABLE 1

| Specimen No. | Diameter at Heat Treatment | Finish Diameter | Core Composition |
| --- | --- | --- | --- |
| 1 | 1.33 mm | 0.25 mm | CDA alloy 270 brass; α phase brass 65% Cu 35% Zn |
| 2 | 0.64 mm | 0.25 mm | CDA alloy 270 brass; α phase brass 65% Cu 35% Zn |
| 3 | 0.25 mm | 0.25 mm | CDA alloy 270 brass; α phase brass 65% Cu 35% Zn |
| 4 | 0.25 mm | 0.25 mm | 40% conductivity copper clad steel |

Example No. 1

Specimen 1 was made by electroplating a thin (approximately 500μ inch±5%) layer of zinc on a wire core of CDA alloy 270 brass with a diameter of 1.30 mm. The wire was diffusion annealed in a batch process performed in an annealing pot in an air atmosphere. The anneal temperature was 177° C. (350° F.). The annealing pot included an atmosphere circulation motor and a fan which was operated during the heat treatment. The time taken to bring the pot up to temperature was 1 to 2 hours. The heat treatment itself was continued for 3 hours after the pot reached the anneal temperature for wire having diameters of 0.64 mm and 0.25 mm. For a larger size wire the anneal time would be proportionately larger. In the case of 1.33 mm wire, the time for heat treatment was 4 hours.

The temperature range during the heat treating could vary from 166° C. to 177° C. The purpose for the heat treatment is to diffuse copper from the core into the zinc coating material and zinc from the coating material into the copper bearing core to create an alloy coating of γ phase brass. The heat treatment temperature was a low diffusion anneal temperature. The heat treatment temperature is preferably lower than the melting point of zinc. The heat treatment time was chosen to convert all of the zinc coating material to y phase alloy material but not so long that any appreciable amount of the γ phase alloy converted to β phase. However, since the heat treatment temperature was relatively low, it is unlikely that β phase would be formed unless a considerably longer heat treatment time were chosen.

Figure 3:
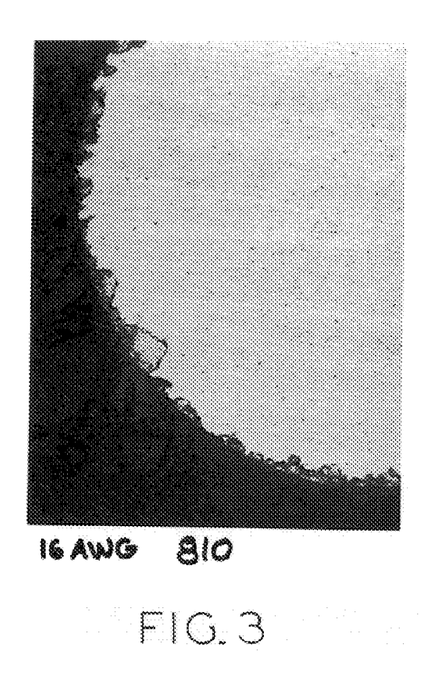
FIG. 3 is a 520 X magnified photograph of a cross section of a 0.25 mm diameter EDM wire which was drawn after heat treatment at a diameter of 1.33 mm.
Figure 4:
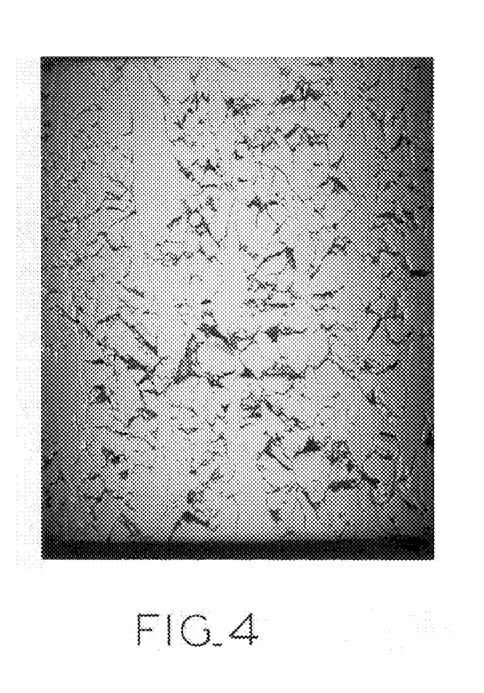
FIG. 4 is a 500 X magnified photograph of the surface of the wire of FIG. 3.

The heat treated wire and annealing pot are normally cooled by natural conduction and/or convection so that the wire can be handled. Generally no more than 1 or 2 hours is required for cooling. The pot may also be unloaded at the conclusion of the heat treatment at heat treatment temperature. After cooling, the wire was cold drawn to its finish diameter of 0.25 mm. The wire can be spooled onto a finish spool directly from the drawing machine or can be respooled to a finish spool on a rewinding machine. The appearance of the resulting wire can be seen in FIGS. 3–5. FIG. 3 shows a partial cross section of the wire, magnified 520 times, and clearly shows the broken-up surface coating of γ material. FIG. 4 shows the actual appearance of the surface when magnified 500 times and clearly shows the gaps or cracks in the surface of the coating material.

Figure 7:
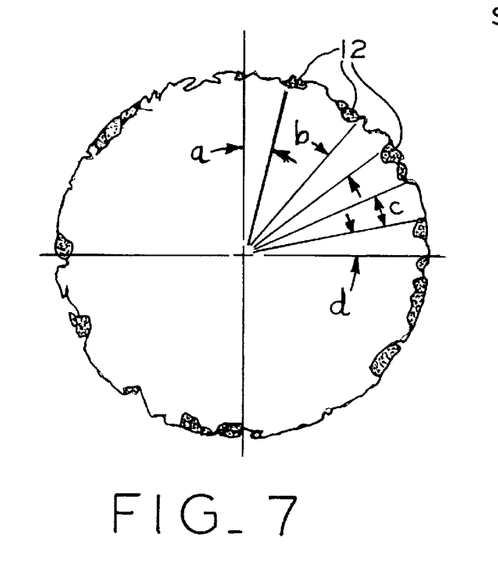
FIG. 7 is a drawing illustrating the manner of computing the surface coverage of an EDM wire coating.

A method was established for calculating a measure of surface coverage. As best seen in FIG. 7, radials can be drawn from a circle centered on a cross section of an EDM wire specimen and the angles which enclose a segment of the outer perimeter of the wire where a surface coating gap exists, i.e., where the wire core is exposed, can be measured. Thus, as shown in FIG. 7, angle "a" indicates a gap in the surface covering. Similarly, angle, "b", "c" and "d" indicate gaps. If all of the angles for all such gaps in the coating are added together and divided by 360°, the resulting number multiplied by 100 will give an indication of the percentage of the wire core surface which is not covered by a coating in the cross section of the wire. By subtracting this number from 100 the EDM wire core surface coverage can be established. This gives a rough measure of EDM wire core surface coverage if the assumption is made that the gaps are distributed uniformly across the surface of the wire. The formula for surface coverage then is, using the method of FIG. 8

$$\% \text{ coverage} = 100 - \left| 100 \times \frac{\Sigma \text{ angles}}{360} \right|$$

It can, of course, be readily understood that if the actual surface coverage were to be calculated, this would be very difficult. A large number of cross sections would have to be taken and the statistical average of the surface coverage would need to be computed. For purposes of a description of the invention, we shall use the method disclosed herein.

As pointed out above, the theoretical surface coverage which would be achieved if the surface coating of the wire before cold drawing were redistributed over the surface area of the wire after cold drawing is much smaller than the actual surface coverage achieved when calculated according to this method.

One would expect that the performance of wire with a surface coating which is discontinuous and includes gaps would be unsatisfactory. However, by referring to Table 2, the results of tests conducted with the EDM wire specimens of Table 1 can be seen in comparison with the results obtained with Cobracut A™ wire. This table shows the results when wire was used in an Agie 120 Machine.

TABLE 2

| Specimen | Rough Cut Speed mm/min | CCA Ratio | Ra μ inch** Rough | Rough/Skim |
|---|---|---|---|---|
| Cobracut A* | 2.68 | 1.00 | 129 | 115 |
| 1 | 3.11 | 1.16 | 137 | 118 |
| 2 | 3.10 | 1.16 | 133 | 115 |
| 3 | 3.16 | 1.18 | 125 | 107 |
| 4 | 3.64*** | 1.36 | 148 | 116 |

*Cobracut A ™ is a commercially available zinc coated brass EDM wire manufactured by Berkenhoff GmbH of Heuchelheim, Germany
**measured with Mituoyo Surftest Model 211
***Power parameter increased to P = 27

Figure 8:
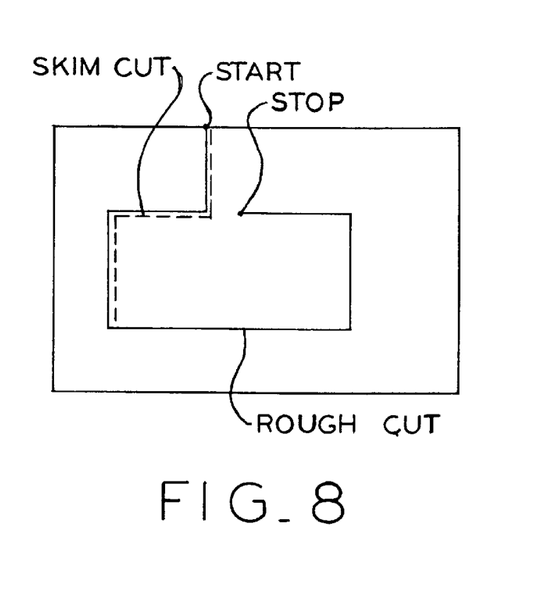
FIG. 8 is a drawing illustrating the manner in which test cuts were made with the wire according to the invention.

FIG. 8 shows the test cuts which were made in a workpiece in order to obtain the results shown in Table 2. The workpiece had a thickness of 42.5 mm and was composed of a D-2 type alloy tool steel. The rough cut started at one edge of the workpiece and then was made to describe a rectangular path in the workpiece. The skim cut started at the same point as the rough cut but went only partially along the path of the rough cut, as shown in dashed lines.

All wire specimens were 0.25 mm in diameter as shown in Table 1. The comparable Cobracut A™ wire was also 0.25 mm in diameter. The power setting (parameter P) was 21 and the remaining machine settings were consistent with the appropriate "CCA Technology." The surface finish is given in Ra per μ inch and is given both for a rough cut and a rough cut followed by a skim cut. The CCA ratio represents the ratio of the cutting speed achieved with the wire specimen according to the invention compared to the cutting speed achieved with Cobracut A™ (CCA) wire. Thus, in Table 2, the CCA ratio for Cobracut A™ wire is 1.00 as that wire is identical to Cobracut A™ wire, thereby providing a CCA ratio of 1.00. However, for Specimen 1, it can be seen that the CCA ratio is 1.16 thereby indicating that Specimen 1 cuts 1.16 times faster than Cobracut A™. This is a 16% improvement in cutting speed as compared to Cobracut A™ wire. Similarly, it can be seen that the surface finish after the rough cut is slightly worse for Specimen 1 than for Cobracut A™ wire. However, when the rough cut is followed by a skim cut, the surface finish is almost identical to the surface finish for Cobracut A™, namely, 118 compared to 115 for Cobracut A™ wire.

Example No. 2

The core of the wire of Specimen 2 is identical to that of the core of Specimen 1, namely CDA alloy 270 brass (a phase brass). However, the size of the wire at heat treatment was 0.64 mm. Heat treatment was similar to Example 1. The finish size of the wire is identical to that for Specimen 1, namely 0.25 mm. The test results show that this specimen has a cutting speed ratio relative to Cobracut A™ of 1.16, identical to that of Specimen 1. The theoretical surface coverage of the coating was 39%. The actual measured surface coating coverage was 58%. The surface roughness of the cut is quite similar to that of Cobracut A™ both after the rough cut and after the skim cut.

Example 3

Figure 5:
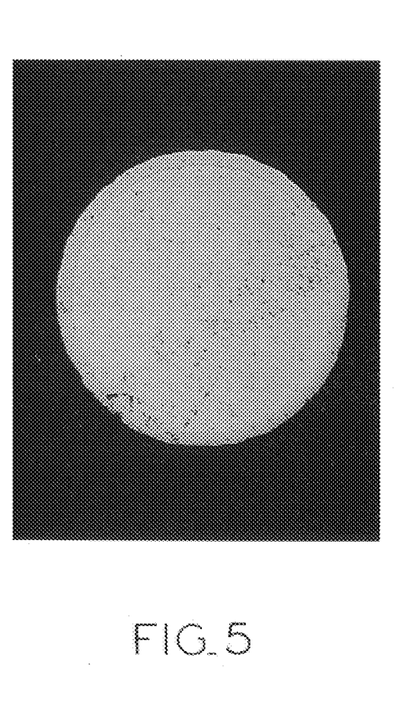
FIG. 5 is a 270 X magnified photograph of a 0.25 mm diameter EDM wire which was heat treated at finish size.
Figure 6:
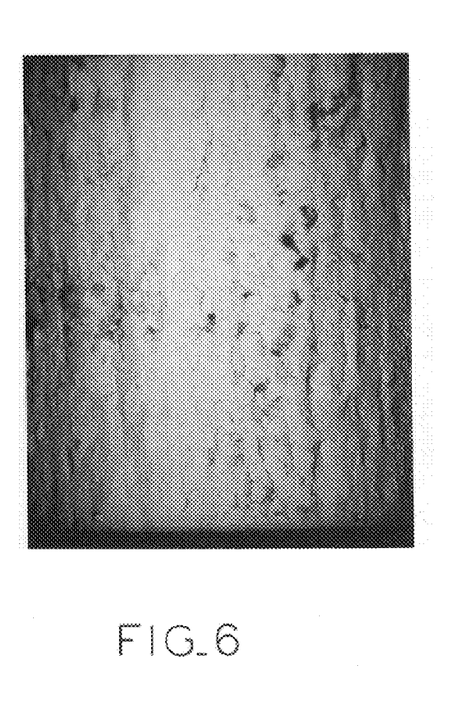
FIG. 6 is a 500 X magnified photograph of the surface of the wire of FIG. 5.

The core wire of Specimen 3 was electroplated with 1200μ inches±5% of zinc at a diameter of 1.30 mm and was drawn to a finish size of 0.25 mm before heat treatment. The core again was CDA alloy 270 brass. Heat treatment was similar to Example 1. FIG. 5 shows a photograph of a cross section of the finished wire magnified 270 times. FIG. 6 shows the surface magnified 500 times. The imperfections shown in FIG. 6 are merely contaminants on the surface of the wire, not gaps or discontinuities in the coating. This can be seen by comparison with FIG. 5. Thus the entire surface of the wire core is covered with a coating without any gaps in the coating. The results of the cutting tests are shown in Table 2. It can be seen that specimen 3 has a cutting speed which is 18% better than that of Cobracut A™ wire. Furthermore, the rough cut surface finish is slightly better than that of Cobracut A™ wire. The skim cut surface finish is also better than that of Cobracut A™ wire.

Example 4

The core of the wire of Specimen 4 consisted of 40% conductivity copper clad steel. This specimen is identical to the wire of Specimen 3 except for the composition of the core. The process for coating and heat treating this core is identical to the process for Specimen 3. The copper clad steel core is sourced at a diameter of 0.72 mm in the annealed condition. It was zinc plated with a coating thickness of 0.03 mm±5% at the source size and cold drawn to a diameter of 0.25 mm at which size it was heat treated at 177° C. (350° F.) for three hours in a manner similar to Specimen 3. The results of the performance tests are shown in Table 2.

Since the core of Specimen 4 was copper clad steel, it was possible to increase the power parameter of the Agie 120 machine from P=21 to P=27 without suffering any wire breaks due to the high fracture toughness of the plain carbon steel core. At the more aggressive power setting of P=27, the metal removal rate during the rough cut was dramatically increased yielding a CCA ratio of 1.36, i.e. Specimen 4 cut 36% faster than Corbracut A™, a zinc coated brass EDM wire. The surface finish after one skim pass was equivalent to that of the Cobracut A™ sample, even though the surface finish after the rough cut was inferior to that produced by the Cobracut A™ sample.

Example 5

A specimen identified as Specimen 5 was prepared in exactly the same manner as Specimen 2 except that it was heat treated at 750° F. for 8 hours at the intermediate diameter of 0.64 mm. Heat treatment at the higher temperature for a longer time transformed the coating to β phase brass in contrast to the γ phase brass coating of Specimen 2. Specimen 2 and Specimen 5 wires were then tested in a manner similar to those of Table 2, except that the EDM machine was a Model 290 Charmilles operated with a standard stratified technology for 0.25 mm diameter wires. The test sample had a thickness of 34.9 mm and was composed of type 4140 AISI alloy steel. The results of this test are shown in Table 3.

TABLE 3

| Specimen No. | Cutting Speed (mm/min) |
| --- | --- |
| 2 | 4.71 |
| 5 | 4.09 |

It can be seen that Specimen 2 with the γ phase coating has a cutting speed which is 15% better than that of a similar specimen with a β phase coating (Specimen 5) with the same coating thickness.

In summary, the test results of Table 2 indicate that a γ phase brass coating, either a partial coating or a full coating, improves the cutting speed by 16% to 18% in wires with an identical core, and by 36% in a wire with a core of higher fracture toughness. The test results of Table 3 indicate that a γ phase brass coating improves the cutting speed by 15% over that achieved by a β phase brass coating on the same core wire. Since a 10% improvement is considered significant, these are very significant increases in cutting speeds. Instead of cutting at higher speed, the operator could also decide to "power down" and to perform a cut at a lower speed and thereby achieving a better surface finish than with conventional EDM wire. Thus, the operator could benefit in the following ways. 1) reduce the time for making a rough cut; 2) rough cut at the same speed as with conventional EDM wire but use fewer skim cuts to achieve the same surface finish as with conventional EDM wire, again saving time; 3) rough cut at the same speed as with conventional EDM wire and make the same number of skim cuts, achieving a better surface finish.

The preceding examples described the use of a copper-zinc γ phase alloy coating. Alternatively, a nickel-zinc γ phase coating could be used. Such a coating would have the additional advantages of a higher zinc content and therefore better flushing as well as a higher melting point so that the zinc would be retained longer. U.S. Pat. No. 4,640,747 describes a method of obtaining a mixture of nickel and zinc in the ratio of 80% zinc to 20% nickel. Heat treating such an intimate mixture resulting from a codeposition at a temperature comparable to the zinc copper diffusion anneal (350° F.) will convert the aforementioned mixture into an alloy of γ phase nickel-zinc.

Figure 9:
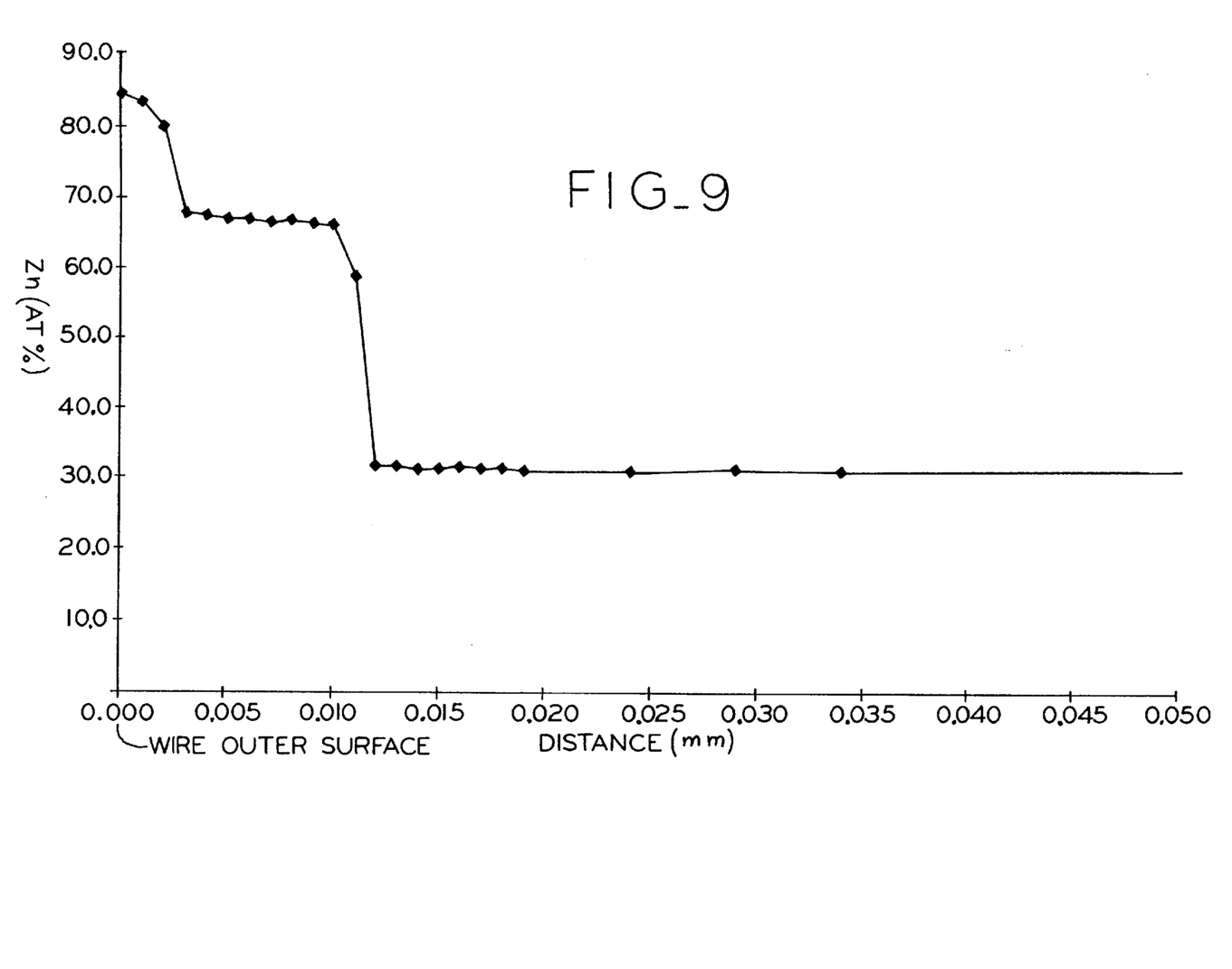
FIG. 9 is a graph illustrating the zinc content as a percent by weight in the coating of the wire of FIG. 4.
Figure 10:
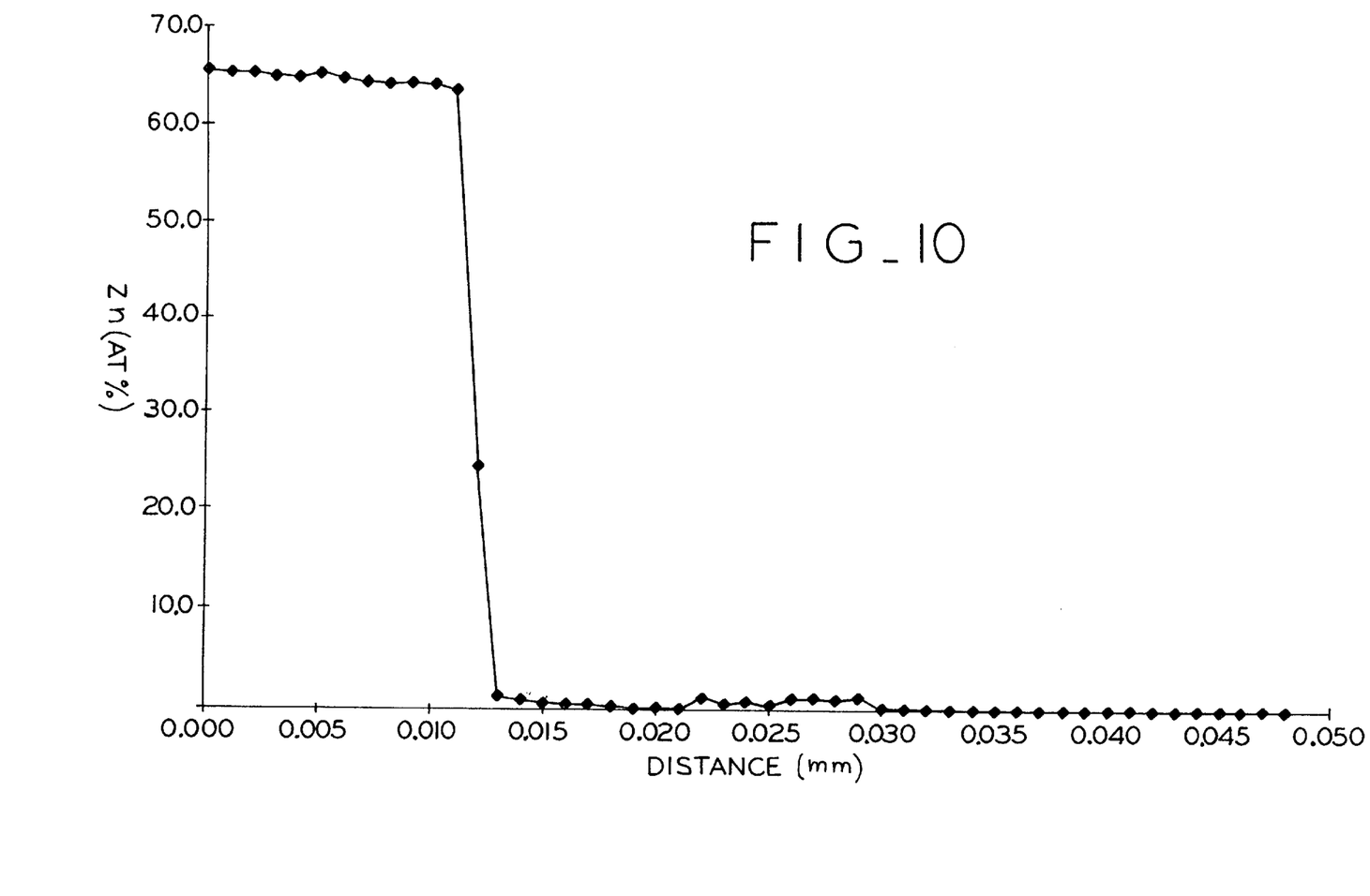
FIG. 10 is a graph illustrating the zinc content as a percent by weight in the coating of an EDM wire according to the invention having a copper clad steel core.

FIGS. 9 and 10 show an analysis of the zinc content for specimens 3 and 4 shown in Tables 1 and 2. In FIG. 9, it can be seen that the zinc content, beginning at the outer surface of the wire and traveling radially inwardly, starts at approximately 85% and then, at a depth of approximately 0.003 mm, drops down to 68%. The zinc content stays substantially at this level until, at a depth of 0.012 mm, the zinc content again drops down to approximately 32%, the level at which it remains. It can thus be seen that two (2) phase layers of alloy are present in the coating. The first phase layer is comprised of residual ε phase alloy with 85% in zinc content. The second layer phase which is present in the coating is a γ phase alloy with a zinc content of 68%. The core itself begins at a depth of about 0.012 mm from the outer surface and includes α phase alloy with nominally 35% zinc. The small amount of ε phase alloy is retained in this sample because of the high level of zinc content in the core. The zinc in the core lowers the driving force for diffusion hence allowing some ε phase material to be retained. Increasing the annealing temperature slightly could eliminate the residual ε phase material, should that be desired, although its high zinc content is certainly not objectionable.

It can also be seen that there is no gradual or minimal reduction in or gradient of zinc content from the outer surface of the EDM wire to the core. Rather, FIG. 9 shows that the zinc content follows a step function with zinc content discontinuities between the various phases of the alloy, thus clearly indicating distinct phase layers. This is shown even more dramatically in FIG. 10 wherein the zinc content of the coating at the surface is substantially constant at 65% and then drops off at the core to 0%. Since the core of Specimen 4 is copper clad steel and contains no zinc, the driving force for diffusion is higher and no ε phase alloy material is retained. Thus, the entire coating of Specimen 4 consists of γ phase material. Clearly, in neither of Specimens 3 and 4 is any β phase alloy (45% zinc) present in the coating.

The core may be made of any suitable metal or metals which have the desired mechanical and electrical characteristics.

An advantage of cold drawing after the diffusion anneal is that it tends to make the wire stiffer and more straight even though the surface coverage of the γ phase coating material will be less than 100%. This is important since a significant number of wire EDM machines being introduced into the industry are equipped with "autothreading" systems to allow the machines to operate unattended around the clock. Most "autothread" systems operate much more reliably with a stiff and straight wire. Typically these "autothread" systems will attempt to rethread the machine four to six times before moving on to the next task or shutting down completely. Just the smallest amount of curvature in the wire can cause an "autothread" system to miss six to ten times consecutively, thereby shutting the machine down and sacrificing valuable productivity until an attendant arrives on the scene.

While it would be desirable to have 100% surface coverage, the test results show that this is not needed for good performance of the resulting EDM wire. It was found that good results can be obtained with less than 100% surface coverage, for instance, with 58% actual surface coverage as calculated according to the method set forth herein.

The relative tenacity (erosion resistance) of a surface layer will be influenced by both the ease with which the layer sublimes (vaporizes) and the magnitude of its melting point. Metals and alloys that vaporize easily will be prone to erosion since vaporization is a mechanism of mass transport. Metals and alloys with a low melting point will also be prone to erosion since they can be easily softened, distorted, and removed by mechanical or hydraulic forces. When considering flushability, one desires just enough tenacity (erosion resistance) to survive the erosion process because the ease of sublimation degrades tenacity while it enhances flushability. Therefore one desires the active surface of an EDM wire electrode to have a low volumetric heat of sublimation combined with a relatively high melting point.

The success of high zinc content brass alloys as high performance coatings for EDM wires would suggest that both the low heat of sublimation and a relatively high melting point of alloys are the most desirable properties. High zinc content alloys will possess a low heat of sublimation which facilitates flushing, and a relatively high melting point will discourage softening or melting, thereby preserving the coating from excessive erosion to make it available during the entire erosion process from the top of the gap to the bottom. Several brass alloys, namely β, γ, and ε phase brasses, meet these criteria because their melting points are typically in the range of 880° C. to 550° C. while their zinc contents typically can range between 45% to 83% zinc. Unfortunately the ε phase is typically very unstable and thermodynamically tends to transform into γ phase and therefore is difficult to retain even though its high zinc content is desirable. However, nickel-zinc alloys have similar melting points, if not higher, and the γ phase of nickel-zinc alloys can range up to 85% zinc. Nickel-zinc alloys are potentially even more attractive than brass alloys as coating materials. The ε phase of the zinc/nickel alloy system is very similar in its physical characteristics to the γ phase of the zinc/copper alloy system with the notable exception that it has a significantly higher zinc content. For example, a zinc/nickel γ phase alloy of a composition 80% zinc/20% nickel has a melting point of approximately 870° C. compared to approximately 800° C. melting point of 65% zinc/35% copper γ phase alloy. The higher zinc content of the zinc/nickel alloy as compared to the zinc/copper alloy dictates a lower volumetric heat of sublimation, and a significantly improved flushability.

However, the zinc, copper-zinc, and nickel-zinc metal or metal alloy systems are not the only systems that can meet the requirement of a relatively low volumetric heat of sublimation combined with a relatively high melting point. Table 4 lists other metals which have a low volumetric heat of sublimation, and for reference also lists their melting points.

TABLE 4

| Metallic Element | Volumetric Heat of Sublimation (KJ/cm³)* | Melting Point (°C.) |
| --- | --- | --- |
| Cadmium | 8.6 | 321 |
| Bismuth | 9.7 | 271 |
| Magnesium | 10.7 | 650 |
| Lead | 12.0 | 327 |
| Zinc | 14.4 | 420 |
| Tin | 18.6 | 449 |
| Aluminum | 32.4 | 660 |

*As calculated from Smithell's Metal Reference Book, (Fifth Edition) 1976

As would be expected, those metallic elements identified in the prior art, namely Cadmium, Bismuth, Lead, Zinc, and Tin are prominently listed. However of these metallic elements, only zinc has been found to be of practical value, and zinc is only of practical value when it is applied as a thin coating because thicker coatings erode too easily. The reason for this is the relatively low melting point of zinc. The other metals identified by the prior art have melting points significantly lower than zinc, except tin which has a melting point approximately equivalent to that of zinc. However, tin is not an attractive candidate for an EDM coating because of its high cost. The prior art identified the value of alloying zinc with copper to form β phase brass, but suggested that only the β brass alloy was the preferred coating for erosion resistance. Indeed β phase brass does have a higher erosion resistance than γ phase brass since its meltings point (880° C.) is higher than that of γ phase brass (800° C.), but the melting point of γ phase brass is still relatively high, high enough to provide adequate erosion resistance. The significantly higher zinc content of γ phase brass then allows EDM wire with such a coating to cut more efficiently than EDM wire with a coating of β phase brass as illustrated by the test results of Specimens 2 and 5. Therefore a γ phase coating of nickel-zinc alloy containing 80% zinc and having a melting point of 870° C. can be expected to perform even more efficiently. Other metallic systems also offer this combination of a relatively low volumetric heat of sublimation (<35 KJ/cm³) and a relatively high melting point (≧550° C.). For example, aluminum and magnesium both meet this criteria and can be expected to provide highly efficiently performing EDM wire coatings when applied to a core wire with the appropriate metallurgical properties. It is known that both aluminum and magnesium workpieces can be machined by the wire EDM process at very high metal removal rates. This is because the same properties that promote efficient flushing of wire debris, promotes efficient flushing of workpiece debris also. Therefore it follows that a good coating system should also provide a workpiece that could be machined at high metal removal rates (speed), or visa versa.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrode wire for use in an electric discharge machining apparatus, said wire comprising:

a core comprising one of a metal and an alloy of a metal;

a coating is disposed on said core, said coating comprising one of a second metal and an alloy of a second metal which is comprised of greater than 50% by weight of said second metal, said second metal having a volumetric heat of sublimation less than 35 kilojoules per cubic centimeter, said coating having a melting point equal to or greater than 550° C., said coating including discontinuities whereby said core is not covered by said coating at said discontinuities.

2. The electrode wire of claim 1, wherein said coating covers less than 100% of the surface area of the core.

3. The electrode wire of claim 1, wherein said alloy or a second metal comprises a copper zinc alloy.

4. The electrode wire of claim 1, wherein said alloy of a second metal comprises a nickel zinc alloy.

5. The electrode wire of claim 1, wherein said core comprises copper clad steel.

6. The electrode wire of claim 1, wherein said core comprises brass.

7. The electrode wire of claim 6, wherein said brass comprises zinc in the range of 5% to 40%, by weight.

8. The electrode wire of claim 1, wherein said second metal is selected from the group consisting of zinc, cadmium, tin, lead, antimony, bismuth, magnesium, and aluminum.

9. The electrode wire according to claim 8 wherein said second metal is zinc and said alloy of a second metal has a zinc content between 58% and 67%.

10. The electric discharge machining wire according to claim 1 wherein said coating essentially consists of a γ phase alloy.

11. An electrode wire for use in an electric discharge machining apparatus, said wire comprising:

a core comprising one of a first metal and an alloy of a first metal;

a coating is disposed on said core, said coating comprising a γ phase alloy of a second metal which has a low volumetric heat of sublimation, said coating having discontinuities whereby said core is not covered by said coating at said discontinuities.

12. An electrode wire for use in an electric discharge machining apparatus, said wire comprising:

a core comprising one of a first metal and an alloy of a first metal; and a coating is disposed on said core of a copper-zinc alloy having a zinc content greater than 50% by weight, said coating having discontinuities whereby said core is exposed at said discontinuities.

13. A process for manufacturing an electric discharge machining wire electrode, said process comprising:

providing a wire core composed of one of a first metal, an alloy of a first metal, and a composite structure of a first metal;

coating said core by means of electrochemical codeposition with a nickel-zinc mixture comprised of nickel and zinc;

heating said coated wire core in the range of 150° C.–400° C. until said nickel-zinc mixture forms a γ phase alloy; and cooling said coated wire core.

14. The process for manufacturing an electric discharge machining electrode wire according to claim 13 wherein said first metal is copper.

15. The process for manufacturing an electric discharge machining electrode wire according to claim 13 wherein said nickel-zinc mixture has a zinc content in the range of 75% to 90% by weight.

16. A process for manufacturing an electric discharge machining wire electrode, said process comprising:

providing a wire core composed of one of a first metal, an alloy of a first metal, and a composite structure of a first metal;

coating said core by means of electrochemical codeposition with a nickel-zinc mixture comprised of nickel and zinc;

heating said coated wire core until said nickel-zinc mixture forms a γ phase alloy, said γ phase alloy having a constant concentration of zinc in the radial direction of said wire; and cooling said coated wire core.

17. An electrode wire for use in an electric discharge machining apparatus, said wire comprising:

a core comprising one of a metal, an alloy of a metal, and a composite structure of a first metal;

a coating is disposed on said core, said coating comprised of a nickel-zinc alloy, said nickel-zinc alloy coating having a constant concentration of zinc in the radial direction of said wire.

18. The electrode wire of claim 17, wherein said nickel-zinc alloy coating comprises a γ phase nickel-zinc alloy.

19. The electrode wire of claim 17, wherein said nickel-zinc alloy coating has a zinc content in the range of 75% to 90% by weight.

20. A process for manufacturing an electric discharge machining electrical wire, said process comprising:

providing a metal core comprising one of a first metal and an alloy of a first metal;

coating said core with a second metal, said second metal having a low volumetric heat of sublimation;

heating said coated core in the range of 150° C.–400° C. in the range of 1–4 hours until said first and second metal form a γ phase alloy; and cooling said wire.

21. A process for manufacturing an electric discharge machining electrical wire, said process comprising:

providing a metal core comprising one of a first metal and an alloy of a first metal, said first metal comprising nickel;

coating said core with a second metal, said second metal having a low volumetric heat of sublimation;

heating said coated core in the range of 150° C.–400° C. until seen first and second metal form a γ phase alloy; and cooling said wire.

22. An electrode wire for use in an electric discharge machining apparatus, said wire comprising:

a core comprising brass which has a zinc content of greater than 30% by weight; and a brass coating is disposed on said core, said brass coating consisting substantially of γ phase brass, said coating including discontinuities whereby said core is not covered by said coating at said discontinuities.

* * * * *

UNITED STATES PATENT AND TRADEMARK OFFICE
CERTIFICATE OF CORRECTION

PATENT NO. : 5,945,010
DATED : August 31, 1999
INVENTOR(S) : Dan Tomalin et al

It is certified that error appears in the above-identified patent and that said Letters Patent is hereby corrected as shown below:

Claim 3, Column 14, Line 60 "or" to --of--

Claim 21, Column 16, Line 42 "seen" to --such--

Signed and Sealed this

Twenty-fifth Day of January, 2000

Attest:

Attesting Officer

Acting Commissioner of Patents and Trademarks